(12) United States Patent
Bond (10) Patent No.: US 7,685,355 B2
(45) Date of Patent: Mar. 23, 2010

(54) HARDWARE MEMORY MANAGEMENT UNIT SIMULATION USING CONCURRENT LOOKUPS FOR ADDRESS TRANSLATION DATA

(75) Inventor: Barry Bond, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 201 days.

(21) Appl. No.: 11/800,707

(22) Filed: May 7, 2007

(65) Prior Publication Data

US 2008/0282056 A1 Nov. 13, 2008

(51) Int. Cl.
*G06F 12/10* (2006.01)
(52) U.S. Cl. ............................. 711/6; 703/27; 711/205; 711/E12.059
(58) Field of Classification Search ................ 711/205, 711/208, 140
See application file for complete search history.

(56) References Cited

U.S. PATENT DOCUMENTS

| 5,491,806 | A | * | 2/1996 | Horstmann et al. .......... 711/207 |
| 5,956,753 | A | * | 9/1999 | Glew et al. ................... 711/205 |
| 5,966,543 | A | | 10/1999 | Hartner et al. |
| 6,047,316 | A | | 4/2000 | Barton et al. |
| 6,128,679 | A | * | 10/2000 | Beale et al. ................... 710/62 |
| 6,289,369 | B1 | | 9/2001 | Sundaresan |
| 6,782,440 | B2 | | 8/2004 | Miller |
| 6,990,665 | B2 | | 1/2006 | Ballantyne |
| 7,162,666 | B2 | | 1/2007 | Bono |
| 7,434,000 | B1 | * | 10/2008 | Barreh et al. ............... 711/118 |
| 7,490,216 | B1 | * | 2/2009 | Chen et al. .................. 711/206 |
| 7,558,939 | B2 | * | 7/2009 | Banerjee et al. ............. 711/205 |
| 2002/0065968 | A1 | * | 5/2002 | Bryant et al. ................ 710/200 |
| 2002/0083252 | A1 | * | 6/2002 | Armstrong et al. .......... 710/260 |
| 2002/0199062 | A1 | * | 12/2002 | Bormann ..................... 711/118 |
| 2003/0018691 | A1 | | 1/2003 | Bono |
| 2005/0050257 | A1 | | 3/2005 | Shakula |
| 2005/0223382 | A1 | | 10/2005 | Lippett |
| 2006/0026384 | A1 | * | 2/2006 | Brandt et al. ............... 711/209 |
| 2006/0069953 | A1 | | 3/2006 | Lippett et al. |
| 2007/0294505 | A1 | * | 12/2007 | Traut et al. .................. 711/207 |

OTHER PUBLICATIONS

Hennessy, John L. and David A. Patterson. Computer Architecture: A Quantitative Approach. 2003. Morgan Kaufmann. Third Edition. pp. 464-465, 530, and 609-610.*

Magnusson, Peter and Bengt Werner. "Efficient Memory Simulation in SimICS." 1996. IEEE.*

Heil, Timothy H. and James E. Smith. "Selective Dual Path Execution." Nov. 8, 1996. University of Wisconsin—Madison. Technical Report.*

(Continued)

*Primary Examiner*—Reginald G Bragdon
*Assistant Examiner*—Nathan Sadler (57) ABSTRACT

Various technologies and techniques are disclosed for concurrently performing address translation data lookups for use by an emulator. On a first thread, a first lookup is performed for address translation data for use by an emulator. On a second thread, a second lookup for the address translation data is concurrently and speculatively performed. The address translation data from a successful lookup from either the first lookup or the second lookup is used to map a simulated physical address to a virtual address of the emulator. For example, the first thread can perform a translation lookaside buffer lookup while the second thread concurrently and speculatively performs a page table entry lookup for the address translation data.

20 Claims, 10 Drawing Sheets

OTHER PUBLICATIONS

Anderson, Thomas E., "The performance of spin lock alternatives for shared-memory multiprocessors", Date: Jan. 1990, vol. 1, No. 1.

Karlin, et al., "Empirical studies of competitve spinning for a shared-memory multiprocessor", Date: 1991.

Shen, et al., "Adaptive two-level thread management for fast MPI execution on shared memory machines", Date: 1999.

AP—949 Using Spin-Loops on Intel Pentium 4 Processor and Intel Xeon Processor. "Using Spin-Loops on Intel® Pentium® 4 Processor and Intel® Xeon™ Processor Version 2.1".

* cited by examiner

```
        MOV EAX, DWORD PTR [InvalidVirtualAddress]
502  LOOP_TOP: PAUSE
        CMP EAX, DWORD PTR [VirtualAddress]
        JZ LOOP_TOP
        ; walk the PTEs now
```

FIG. 10

HARDWARE MEMORY MANAGEMENT UNIT SIMULATION USING CONCURRENT LOOKUPS FOR ADDRESS TRANSLATION DATA

BACKGROUND

Emulators allow software developers to test software that is targeted for particular devices without having the actual device at hand. For example, an emulator can be used to simulate how a particular software program designed for a personal digital assistant or phone device will look and operate without loading it on a physical device. Behind the scenes, emulators emulate the memory management unit of the processor of a respective device. This means that addresses inside the emulator must be translated to addresses on the host compiler. A particular software program typically runs slower using an emulator as opposed to running the program on the native device.

SUMMARY

Various technologies and techniques are disclosed for concurrently performing address translation data lookups for use by an emulator. On a first thread, a first lookup is performed for address translation data for use by the emulator. On a second thread, a second lookup for the address translation data is concurrently and speculatively performed. The address translation data from a successful lookup from either the first lookup or the second lookup is used to map a simulated physical address to a virtual address of the emulator. In one implementation, the first thread can perform a translation lookaside buffer lookup while the second thread concurrently and speculatively performs a page table entry lookup for the address translation data.

In one implementation, spinloops are used by the second thread. For example, before beginning a translation lookaside buffer lookup on the first thread, a virtual address can be passed over to a second thread. Using a spinloop, the second thread pauses execution and waits until the virtual address in memory changes from an invalid virtual address to a valid value. When the virtual address in memory has changed to the valid value, a page table entry lookup begins. Once the page table entry lookup has completed, the second thread writes a return value to a global variable where the first thread can pick up the return value via another spinloop.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an emulator, but the system also serves other purposes in addition to these. In one implementation, one or more of the techniques described herein can be implemented as features within an emulator program such as MICROSOFT® Device Emulator, or from any other type of program or service that emulates the operation of another device using software.

In one implementation, a system is provided that concurrently performs address translation data lookups for use by an emulator. A first lookup is performed for address translation data on a first thread. A second lookup for the address translation data is concurrently and speculatively performed on a second thread. The term "speculatively" as used herein is meant to include an operation whose results may or may not prove to be useful. The address translation data from a successful lookup from either the first lookup or the second lookup is used to map a simulated physical address to a virtual address of the emulator. For example, the first thread can perform a translation lookaside buffer (TLB) lookup while the second thread concurrently and speculatively performs a page table entry (PTE) lookup for the address translation data. The term "translation lookaside buffer lookup" as used herein is meant to include lookups that access a cache of the results. The term "page table entry lookup" as used herein is meant to include lookups that access a page table data structure that stores mappings between virtual addresses and physical addresses. Page table entry lookups are typically slower than translation lookaside buffer lookups, but have access to more data.

Figure 1:
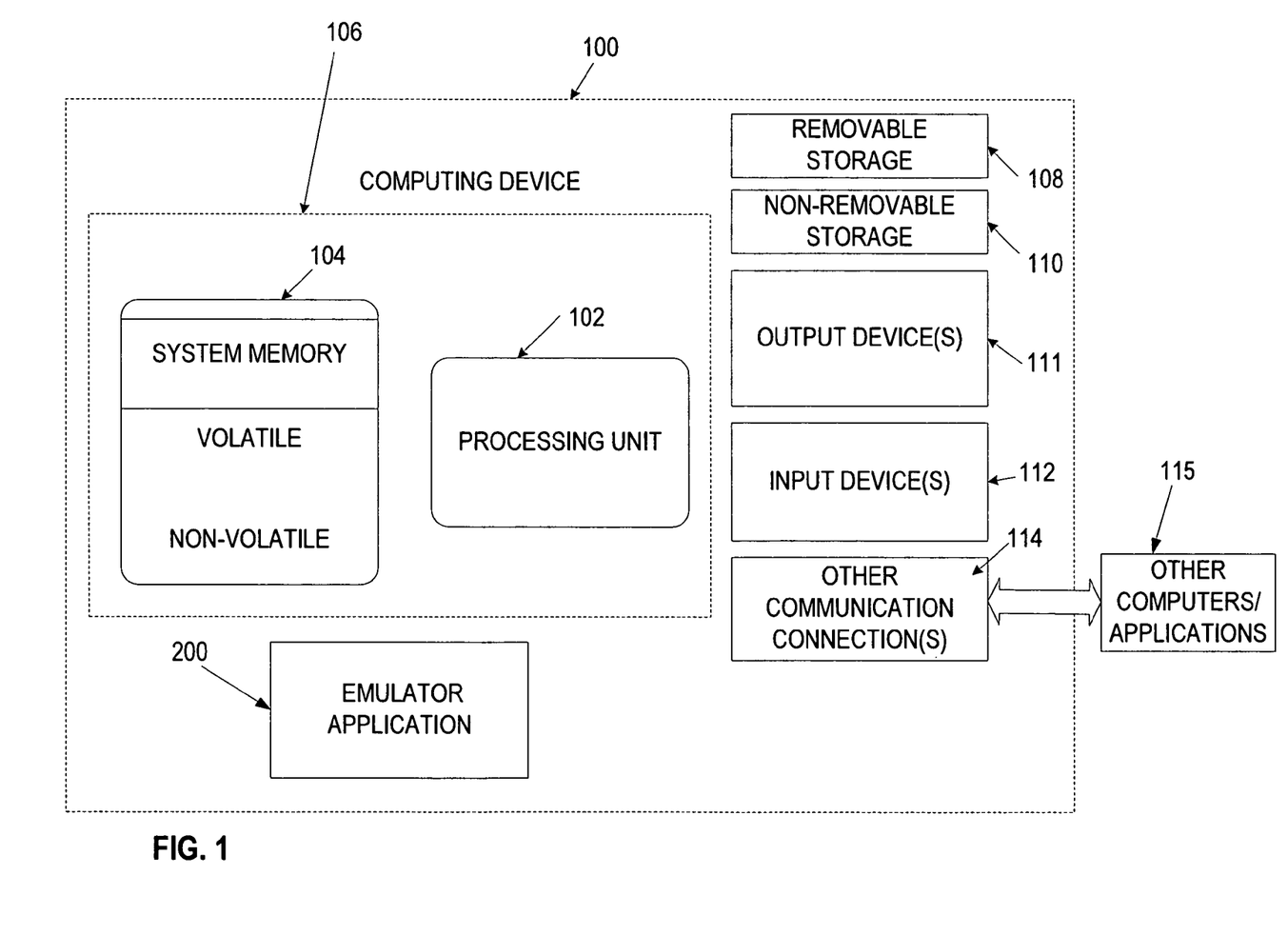
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes emulator application 200. Emulator application 200 will be described in further detail in FIG. 2.

Figure 2:
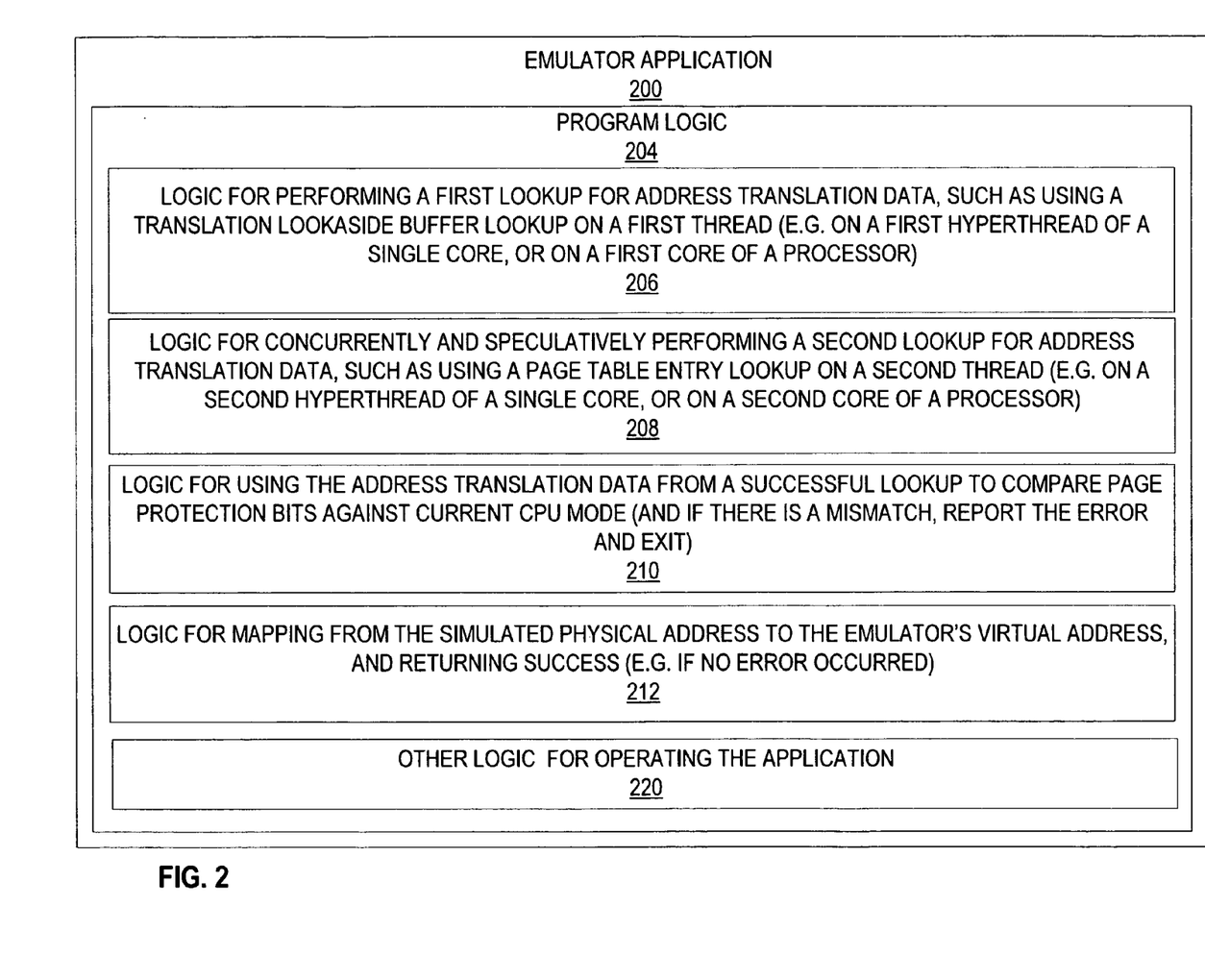
FIG. 2 is a diagrammatic view of an emulator application of one implementation operating on the computer system of FIG. 1.

Turning now to FIG. 2 with continued reference to FIG. 1, an emulator application 200 operating on computing device 100 is illustrated. Emulator application 200 is one of the application programs that reside on computing device 100. However, it will be understood that emulator application 200 can alternatively or additionally be embodied as computer-executable instructions on one or more computers and/or in different variations than shown on FIG. 1. Alternatively or additionally, one or more parts of emulator application 200 can be part of system memory 104, on other computers and/or applications 115, or other such variations as would occur to one in the computer software art.

Emulator application 200 includes program logic 204, which is responsible for carrying out some or all of the techniques described herein. Program logic 204 includes logic for performing a first lookup for address translation data, such as using a translation lookaside buffer lookup on first thread (e.g. on a first hyperthread of a single core, or on a first core of a processor) 206; logic for concurrently and speculatively performing a second lookup for address translation data, such as using a page table entry lookup on second thread (e.g. on second hyperthread of a single core, or on a second core of a processor) 208; logic for using the address translation data from a successful lookup to compare page protection bits against current CPU mode (and if there is a mismatch, report the error and exit) 210; logic for mapping from the simulated physical address to the emulator's virtual address, and returning success (e.g. if no error occurred) 212; and other logic for operating the application 220. In one implementation, program logic 204 is operable to be called programmatically from another program, such as using a single call to a procedure in program logic 204.

Figure 3:
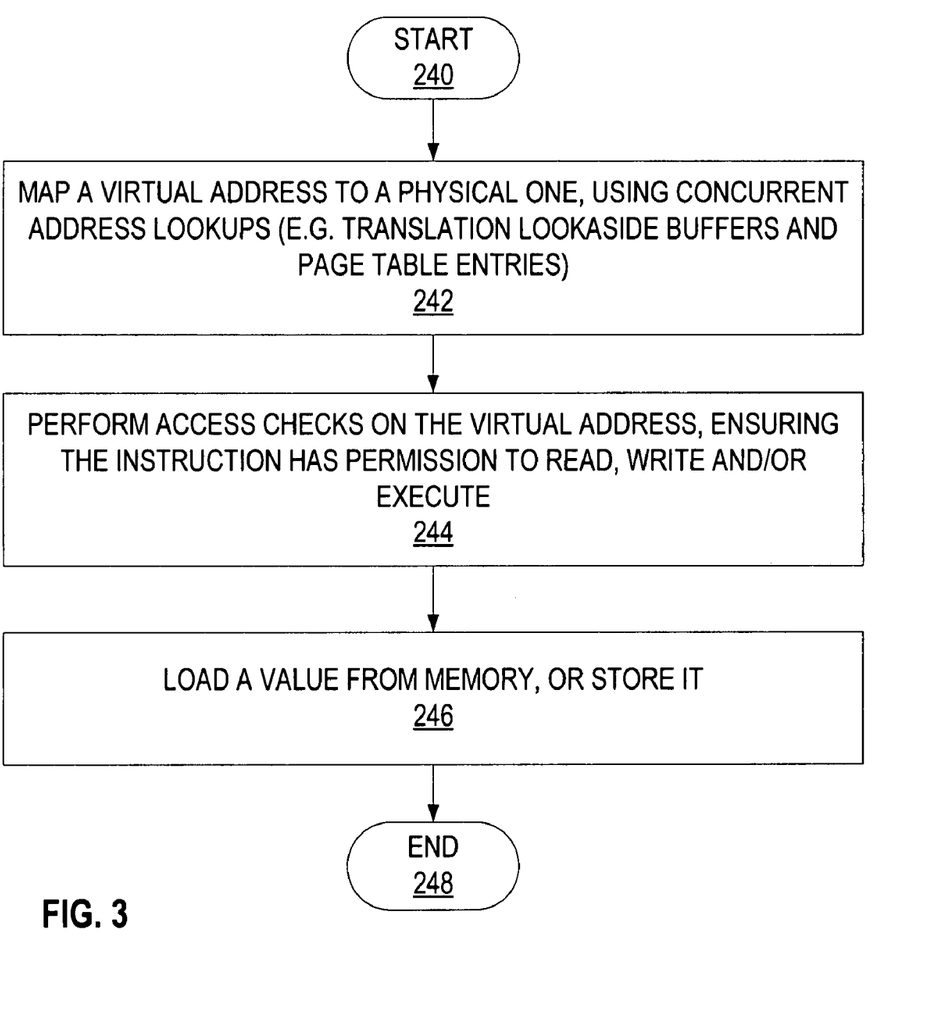
FIG. 3 is a high-level process flow diagram for one implementation of the system of FIG. 1.

Turning now to FIGS. 3-7 with continued reference to FIGS. 1-2, the stages for implementing one or more implementations of emulator application 200 are described in further detail. FIG. 3 is a high level process flow diagram for emulator application 200. In one form, the process of FIG. 3 is at least partially implemented in the operating logic of computing device 100. The process begins at start point 240 with mapping a virtual address to a physical one, using concurrent address lookups (e.g. translation lookaside buffers and page table entries) (stage 242). Access checks are performed on the virtual address, ensuring the instruction has permission to read, write and/or execute (stage 244). The system then loads a value from memory, or stores it (stage 246). The process ends at end point 248.

Figure 4:
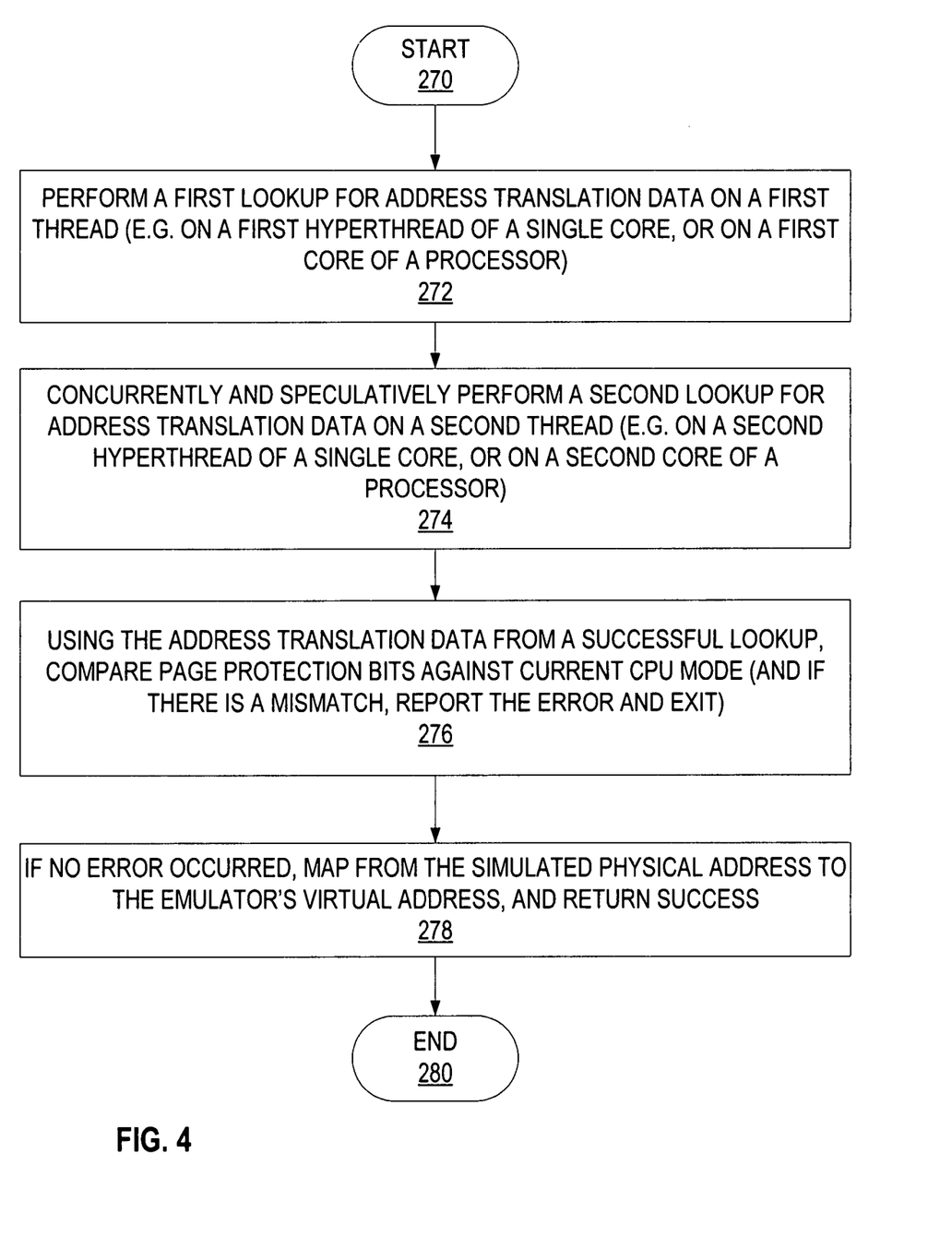
FIG. 4 is a process flow diagram for one implementation of the system of FIG. 1 illustrating the stages involved in mapping a virtual address to a physical address using concurrent address lookups.

FIG. 4 illustrates one implementation of the stages involved in mapping a virtual address to a physical address using concurrent address lookups. In one form, the process of FIG. 4 is at least partially implemented in the operating logic of computing device 100. The process begins at start point 270 with performing a first lookup for address translation data on a first thread (e.g. on a first hyperthread of a single core, or on a first core of a processor) (stage 272). The system concurrently and speculatively performs a second lookup for address translation data on a second thread (e.g. on a second hyperthread of the single core, or on a second core of a processor) (stage 274). Using the address translation data from a successful lookup, compare page protection bits against current CPU mode (and if there is a mismatch, report the error and exit) (stage 276). If no error occurred, the system maps from the simulated physical address to the emulator's virtual address, and returns success (stage 278). In one implementation, the mapping from the simulated physical address to the emulator's virtual address happens in a separate step as shown in stage 278. However, in another implementation, stages 272 and 278 are combined into a single step, with an emulator translating from an emulated virtual address directly to a host virtual address without going through the in-between emulated physical address. The process ends at end point 280.

Figure 5:
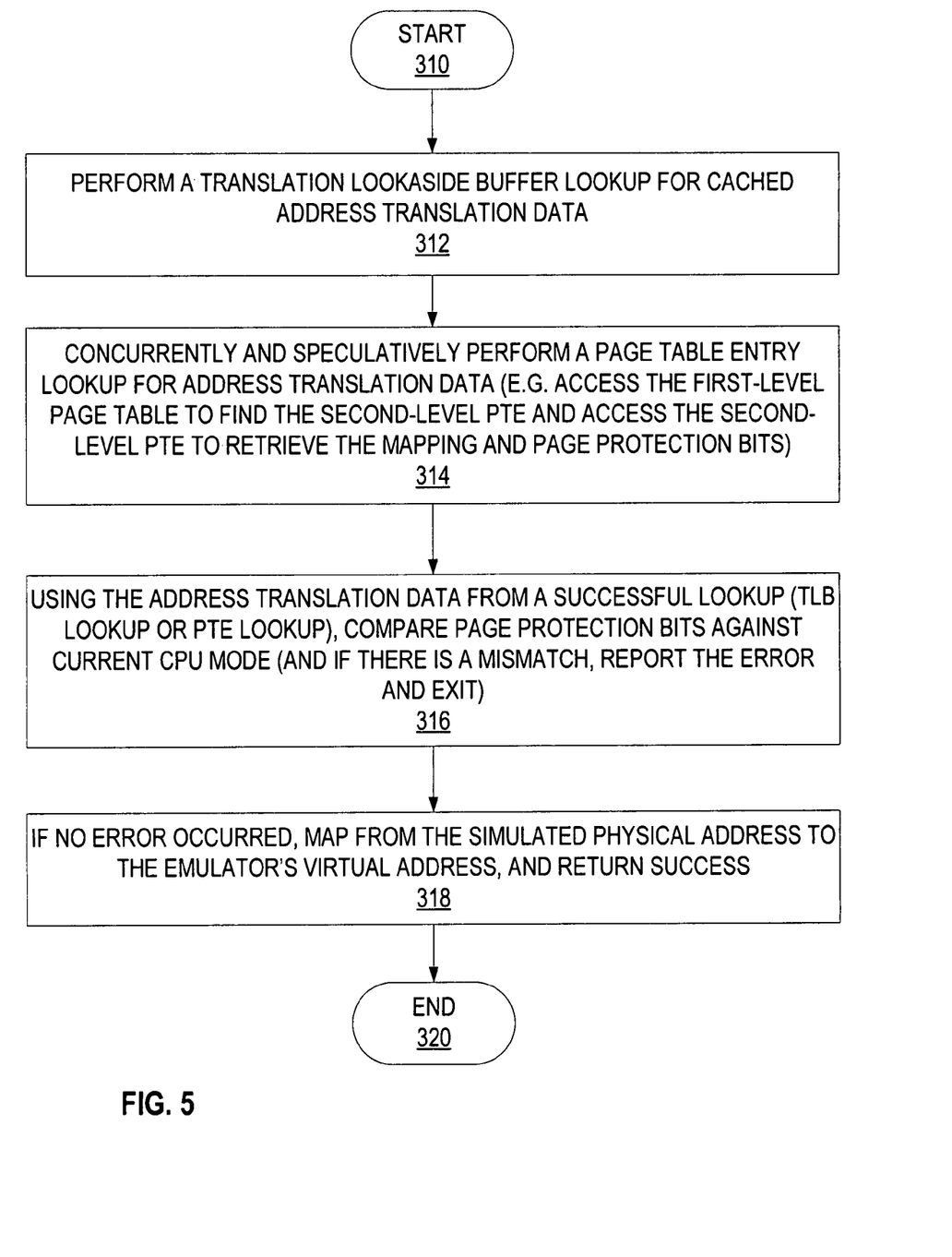
FIG. 5 is a process flow diagram for one implementation of the system of FIG. 1 illustrating the stages involved in performing a translation lookaside buffer lookup concurrently with a speculative page table entry lookup.

FIG. 5 illustrates one implementation of the stages involved in performing a translation lookaside buffer lookup concurrently with a speculative page table entry lookup. In one form, the process of FIG. 5 is at least partially implemented in the operating logic of computing device 100. The process begins at start point 310 with performing a translation lookaside buffer lookup for cached address translation data (stage 312). The system concurrently and speculatively performs a page table entry lookup for address translation data (e.g. accesses the first-level page table to find the second-level PTE and accesses the second-level PTE to retrieve the mapping and page protection bits) (stage 314). Using the address translation data from a successful lookup (TLB lookup or PTE lookup), the system compares page protection bits against current CPU mode (and if there is a mismatch, report the error and exit) (stage 316). If no error occurred, the system maps from the simulated physical address to the emulator's virtual address, and returns success (stage 318). In one implementation, the mapping from the simulated physical address to the emulator's virtual address happens in a separate step as shown in stage 318. However, in another implementation, stages 312 and 318 are combined into a single step, with an emulator translating from an emulated virtual address directly to a host virtual address without going through the in-between emulated physical address. The process ends at end point 320.

Figure 6:
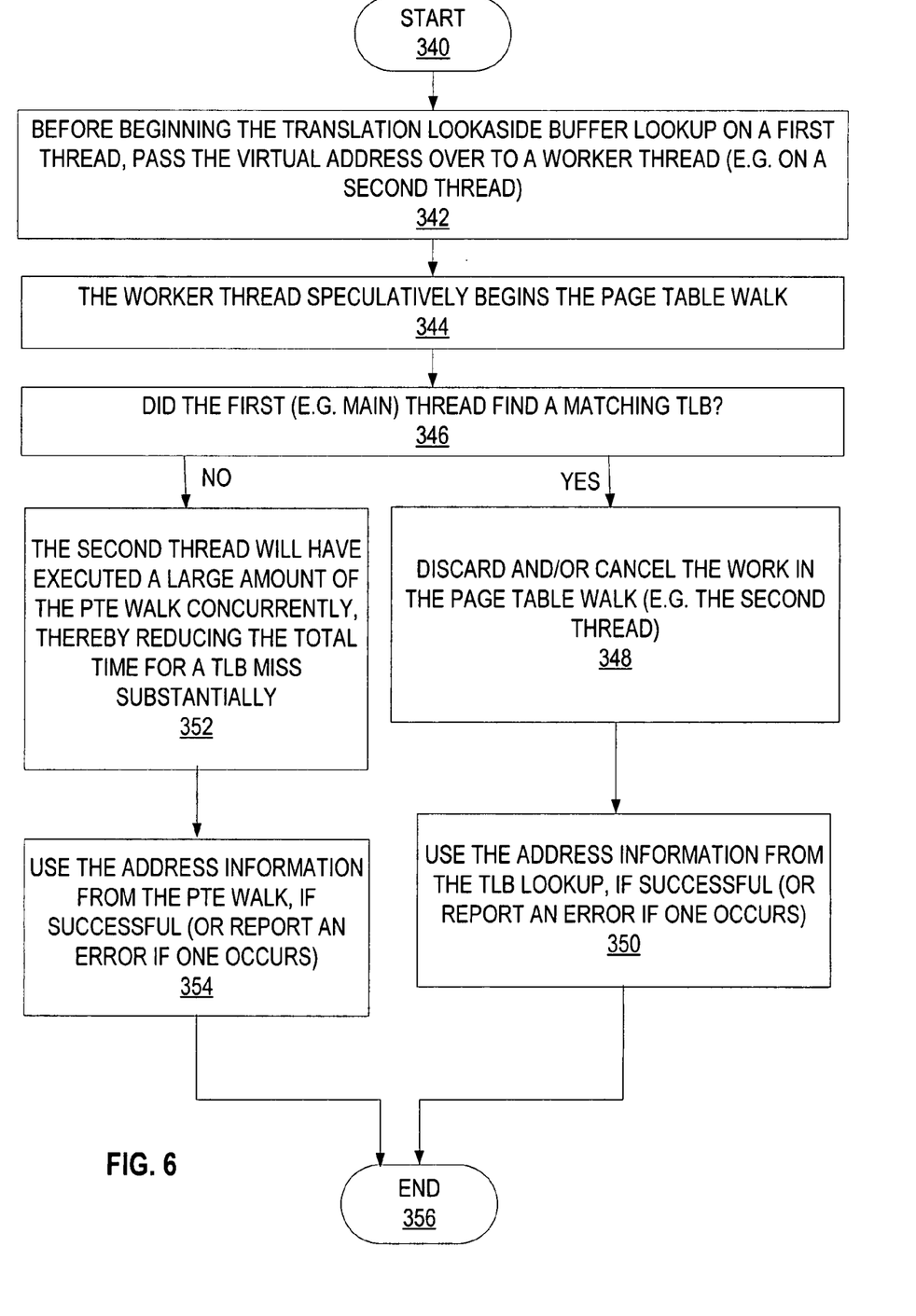
FIG. 6 is a process flow diagram for one implementation of the system of FIG. 1 that illustrates the stages involved in performing a translation lookaside buffer lookup while concurrently and speculatively beginning a page table walk on a separate worker thread.

FIG. 6 illustrates one implementation of the stages involved in performing a translation lookaside buffer lookup while concurrently and speculatively beginning a page table walk on a separate worker thread. In one form, the process of FIG. 6 is at least partially implemented in the operating logic of computing device 100. The process begins at start point 340 with passing the virtual address over to a worker thread (e.g. on a second thread) before beginning the translation lookaside buffer lookup on a first thread (stage 342). The second/worker thread speculatively begins the page table entry lookup (e.g. walk) (stage 344). If the first/main thread found a matching TLB entry (decision point 346), then the system discards and/or cancels the work in the page table walk (e.g. the second thread) (stage 348) and uses the address information from the TLB lookup, if successful (or report an error if one occurs) (stage 350). The process ends at end point 356.

If the first/main thread did not find a matching TLB entry (decision point 346), then the second thread will have executed a large amount of the page table entry lookup/walk concurrently, thereby reducing the total time for the TLB miss substantially (stage 352). When the page table entry lookup finishes, the system uses the address information from the PTE lookup, if successful (or report an error if one occurs) (stage 354). The process ends at end point 356.

Figure 7:
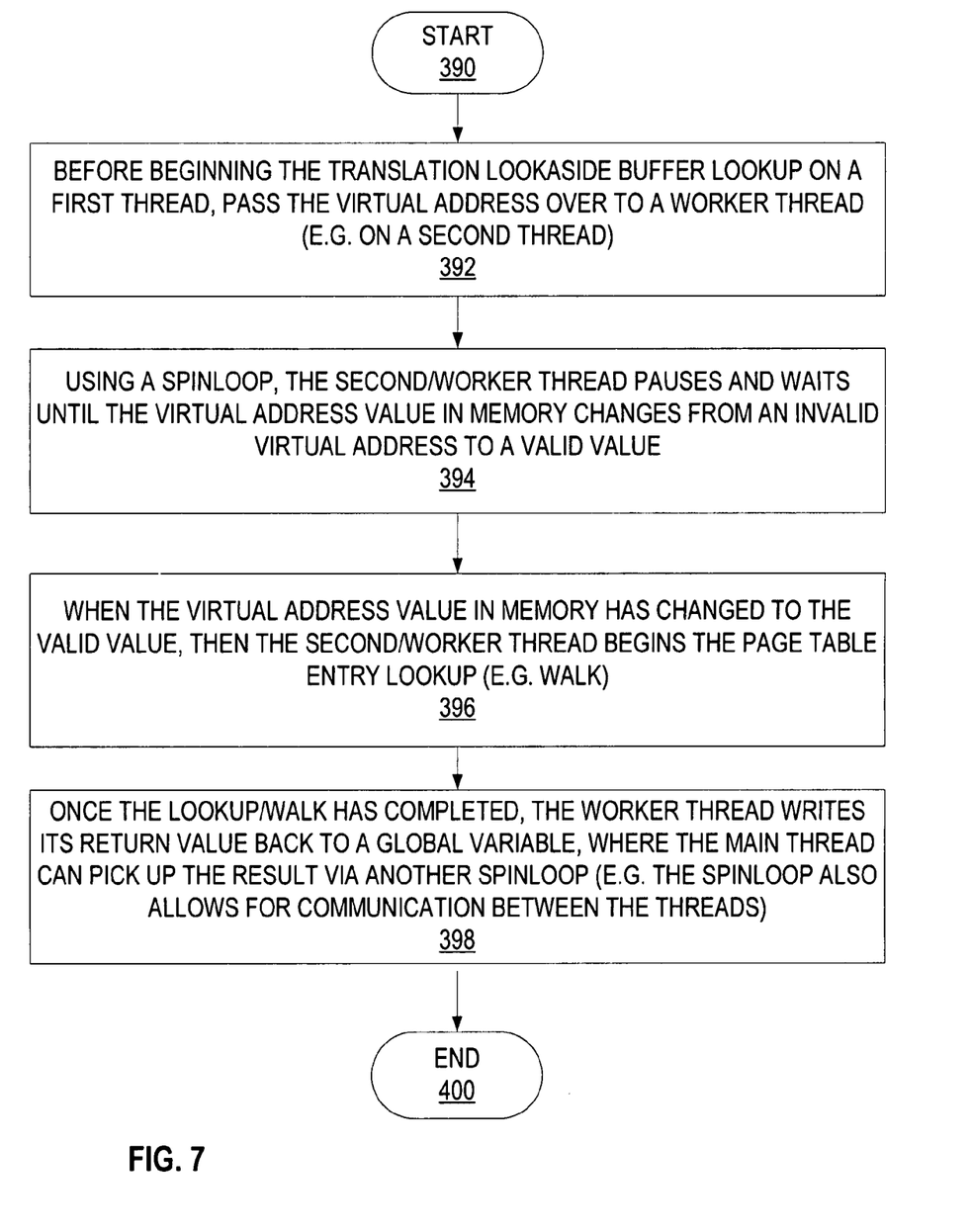
FIG. 7 is a process flow diagram for one implementation of the system of FIG. 1 that illustrates the stages involved in using a spinloop to perform concurrent address lookups.

FIG. 7 illustrates one implementation of the stages involved in using a spinloop to perform concurrent address lookups. In one form, the process of FIG. 7 is at least partially implemented in the operating logic of computing device 100. The process begins at start point 390 with passing the virtual address over to a worker thread (e.g. on a second thread) before beginning the translation lookaside buffer lookup on first thread (stage 392). Using a spinloop, the second/worker thread pauses and waits until the virtual address value in memory changes from an invalid virtual address to a valid value (stage 394). When the virtual address value in memory has changed to the valid value, then the second/worker thread begins the page table entry lookup/walk (stage 396). Once the walk has completed, the worker thread writes its return value back to a global variable, where the main thread can pick up the result via another spinloop (e.g. the spinloop also allows for communication between the threads) (stage 398). The process ends at end point 400.

Figure 8:
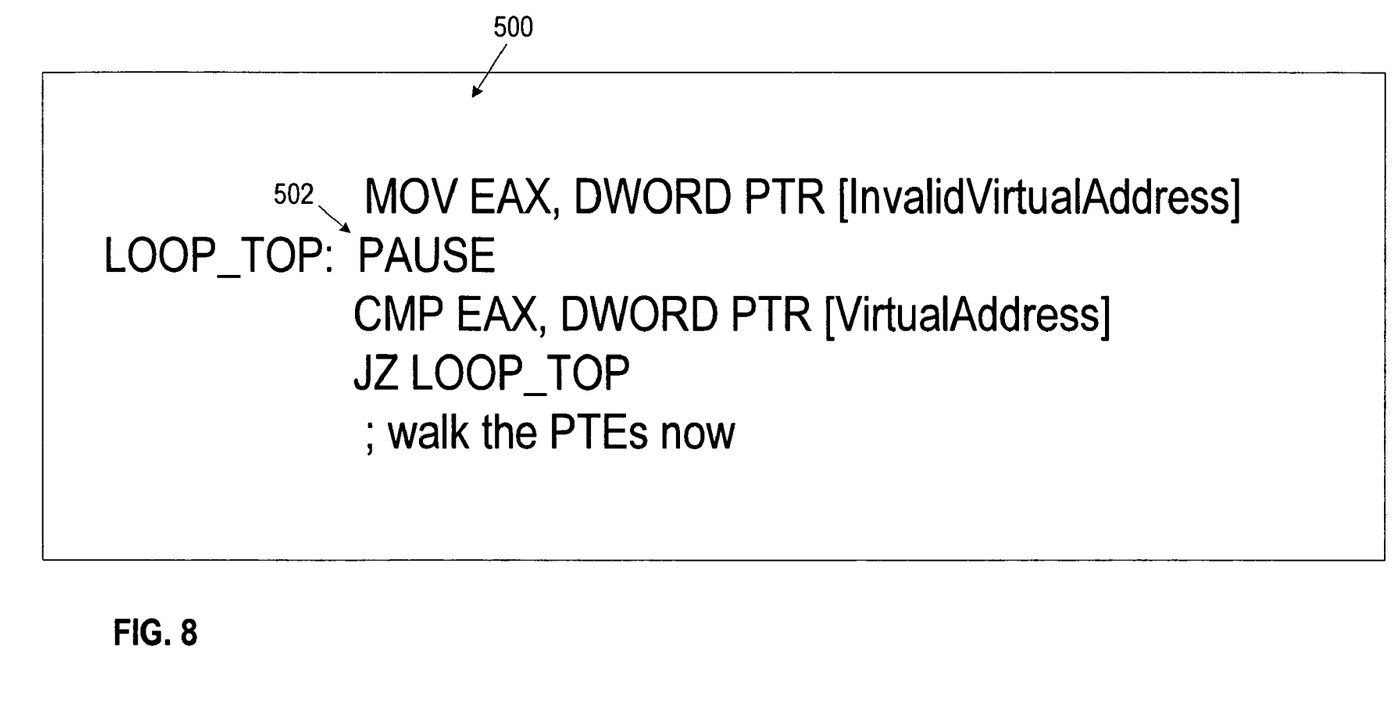
FIG. 8 is a diagram for one implementation of the system of FIG. 1 that illustrates code for an exemplary spinloop.

FIG. 8 is a diagram for one implementation of the system of FIG. 1 that illustrates code for an exemplary spinloop 500. The example shown is written using some x86 assembly code. The spinloop is executed by the second thread that is performing the second lookup, such as the page table entry lookup. The PAUSE instruction 502 throttles the x86 code down so the spinloop executes at approximately the speed of the memory bus, rather than at the rate of the core itself. The pause instruction causes the second lookup to wait until the invalid virtual address value in memory becomes a valid value before it continues. In one implementation, the spinloop is most efficient when two communicating threads are sharing one data cache, such as with two hyperthreads in a core, or two cores in a processor package.

Figure 9:
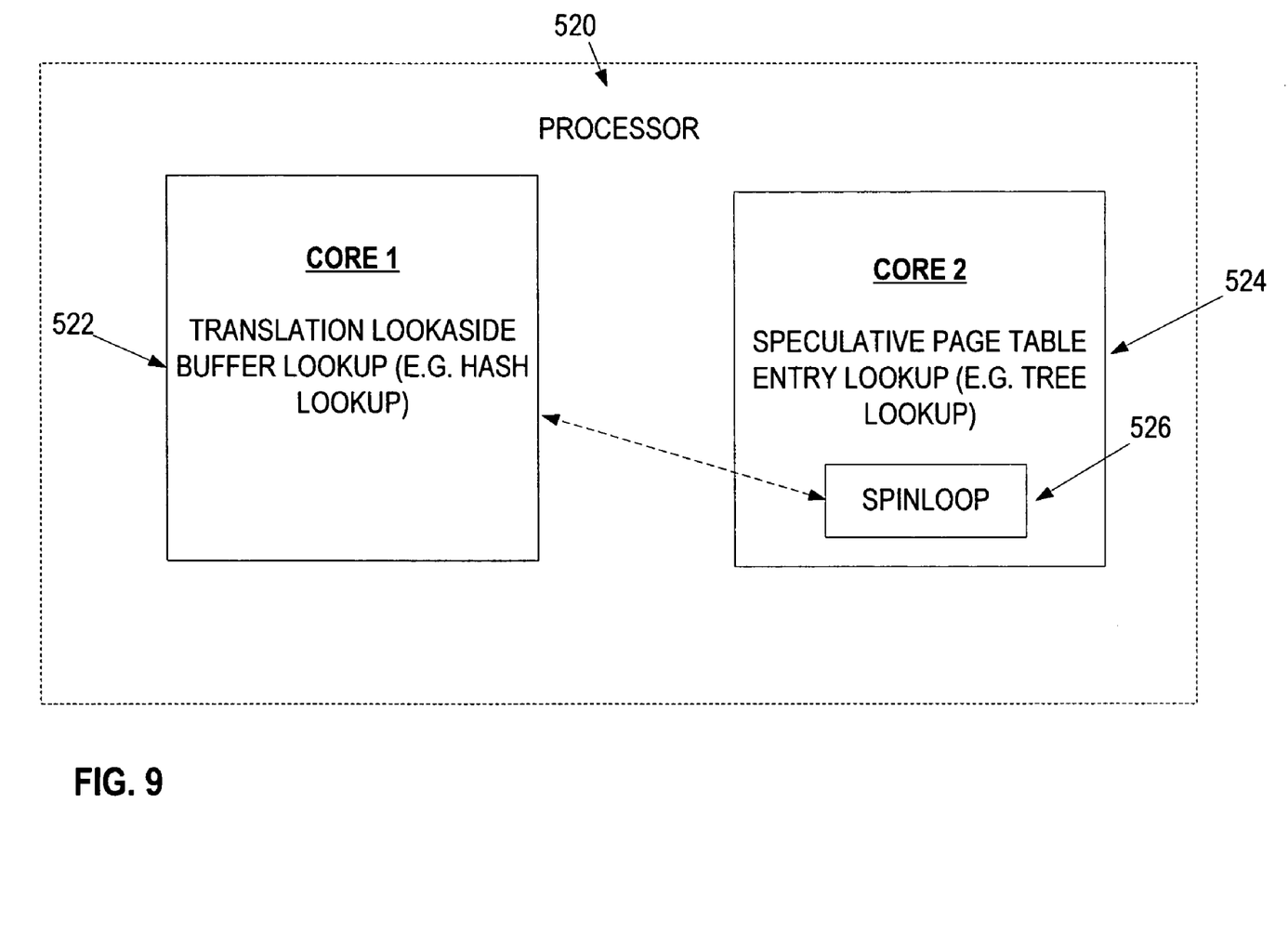
FIG. 9 is a logical diagram for one implementation of the system of FIG. 1 that illustrates performing concurrent address translation data lookups on two separate cores of a processor.

FIG. 9 is a logical diagram for one implementation of the system of FIG. 1 that illustrates performing concurrent address translation data lookups on two separate cores (522 and 524) of a processor 520. As shown in the example of FIG. 9, the first core 522 is performing a translation lookaside buffer lookup concurrently with the speculative page table entry lookup being performed by the second core 524. The second core 524 is using the spinloop 526 to communicate with the first lookup, and to pause execution until the right moment, as described in FIG. 8.

Figure 10:
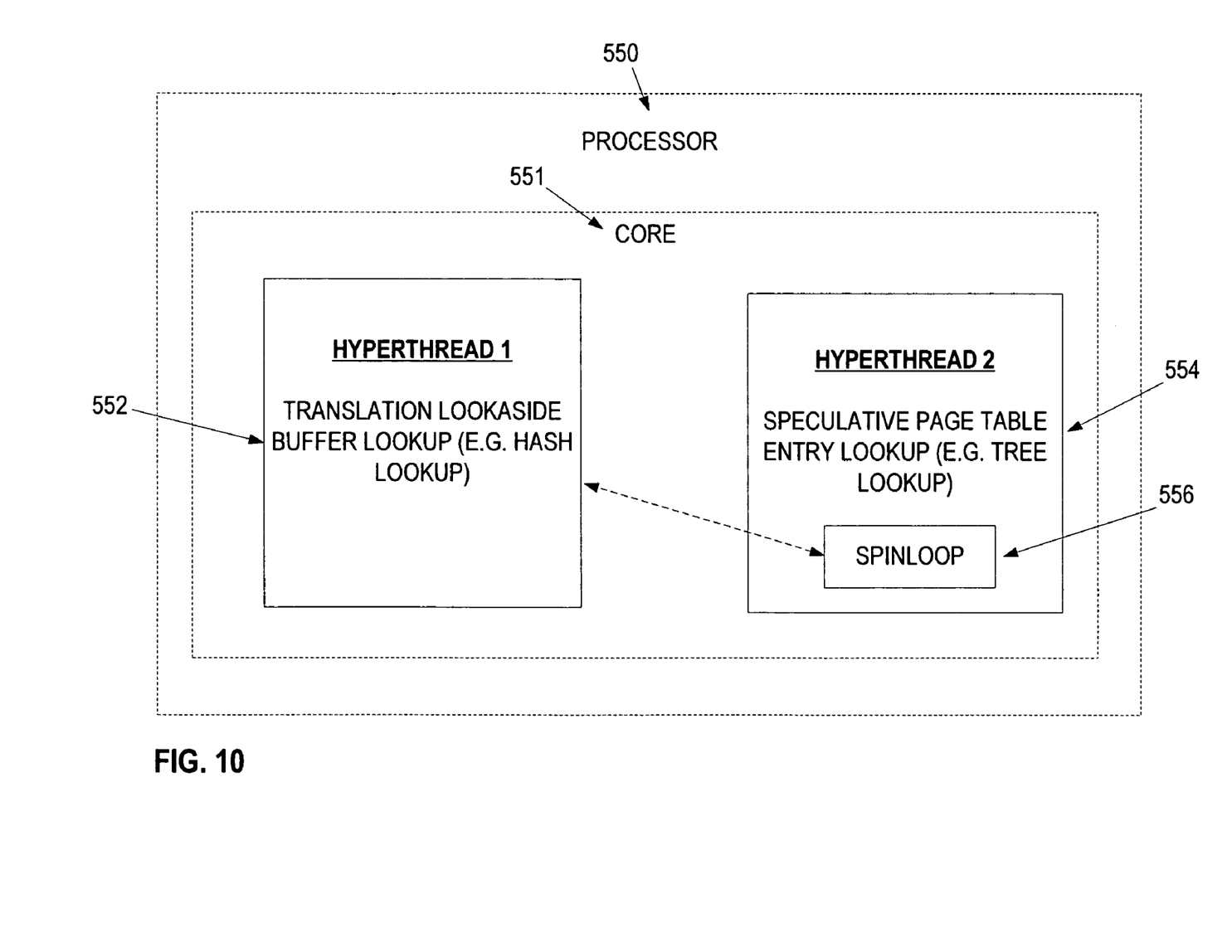
FIG. 10 is a logical diagram for one implementation of the system of FIG. 1 that illustrates performing concurrent address translation data lookups on two separate hyperthreads of a single core of a processor.

Similar to FIG. 9, FIG. 10 is a logical diagram for one implementation of the system of FIG. 1 that illustrates performing concurrent address translation data lookups on two separate hyperthreads (552 and 554) of a single core 551 of a processor 550. As shown in the example of FIG. 10, the first hyperthread 552 is performing a translation lookaside buffer lookup concurrently with the speculative page table entry lookup being performed by the second hyperthread 554. The second hyperthread 554 is using the spinloop 556 to communicate with the first lookup, and to pause execution until the right moment, as described in FIG. 8.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium having stored computer-executable instructions for causing a computer to perform steps comprising:
 performing concurrent lookups for address translation data for use by an emulator to map a simulated physical address to a virtual address of the emulator, wherein performing the concurrent lookups comprises:
  on a first thread, performing a first lookup for the address translation data in a cache of address translation data, wherein an entry from the cache is to be used by the emulator as the address translation data if the first lookup in the cache results in a match; and
  on a second thread, receiving the virtual address of the emulator from the first thread and concurrently and speculatively performing a second lookup for the address translation data in a data structure that stores more address translation data than the cache, wherein an entry from the data structure is to be used by the emulator as the address translation data if the first lookup in the cache does not result in a match;
 determining if the first lookup results in a miss or a match while the second lookup is being performed on the second thread; and
 using the address translation data from a successful lookup from either the first lookup or the second lookup to map the simulated physical address to the virtual address of the emulator.

2. The computer-readable storage medium of claim 1, wherein the first lookup is performed using a translation lookaside buffer lookup.

3. The computer-readable medium storage of claim 1, wherein the second lookup is performed using a page table entry lookup.

4. The computer-readable storage medium of claim 3, wherein prior to performing the first lookup in the cache, the first thread passes the virtual address of the emulator over to the second thread that performs the page table entry lookup.

5. The computer-readable storage medium of claim 1, wherein the first and second threads are executed on two separate hyperthreads in a core of a processor.

6. The computer-readable storage medium of claim 1, wherein the first and second threads are executed on two separate cores of a processor.

7. The computer-readable storage medium of claim 1, wherein the second thread uses a spinloop to communicate with the first thread.

8. The computer-readable storage medium of claim 1, wherein if the first lookup results in a match, then a result from the second lookup is discarded.

9. The computer-readable storage medium of claim 1, wherein if the first lookup results in a match while the second lookup is being performed on the second thread, then the second lookup is cancelled.

10. A computer-implemented method for performing concurrent address translation data lookups for use by an emulator on a computer, the method comprising the steps of:
    performing, on a first thread of a processor of the computer, a translation lookaside buffer lookup for address translation data for use by the emulator to map a simulated physical address to a virtual address of the emulator if the translation lookaside buffer lookup results in a match;
    receiving, at a second thread of the processor of the computer, the virtual address of the emulator from the first thread;
    concurrently and speculatively performing, on the second thread of the processor of the computer, a page table entry lookup for the address translation data for use by the emulator if the translation lookaside buffer lookup does not result in a match;
    determining if the translation lookaside buffer lookup results in a miss or a match while the page table entry lookup is being performed on the second thread; and
    using the address translation data from a successful lookup of either the translation lookaside buffer lookup or the page table entry lookup to map the simulated physical address to the virtual address of the emulator.

11. The method of claim 10, further comprising:
    prior to beginning the translation lookaside buffer lookup on the first thread, passing, from the first thread, the virtual address of the emulator over to the second thread.

12. The method of claim 11, wherein upon receiving the virtual address of the emulator, the second thread begins the page table entry lookup.

13. The method of claim 10, wherein if the first thread located a match using the translation lookaside buffer lookup, then address information resulting from the page table entry lookup is discarded.

14. The method of claim 10, wherein if the first thread did not locate a match using the translation lookaside buffer lookup, then the second thread will have executed a large amount of the page table entry lookup concurrently.

15. The method of claim 14, wherein a total time for a translation lookaside buffer lookup miss and a successful page table entry lookup is reduced.

16. The method of claim 10, wherein the second thread uses a spinloop to pause execution of the second thread until a virtual address value in memory changes from an invalid virtual address to a valid value.

17. The method of claim 10, wherein the second thread uses a spinloop to communicate with the first thread.

18. A computer-readable storage medium having stored computer-executable instructions causing a computer to perform the steps recited in claim 10.

19. A computer-implemented method for using a spinloop to perform concurrent address translation data lookups in an emulator on a computer, the method comprising the steps of:
    before beginning a translation lookaside buffer lookup on a first thread of a processor of the computer, passing a virtual address of the emulator over to a second thread of the processor of the computer;
    performing, on the first thread, the translation lookaside buffer lookup for locating address translation data for mapping a simulated physical address to a virtual address of the emulator;
    receiving, at a second thread of the processor of the computer, the virtual address of the emulator from the first thread and pausing execution of the second thread using a spinloop until the virtual address in memory changes from an invalid virtual address to a valid value;
    when the virtual address in memory has changed to the valid value, beginning a page table entry lookup on the second thread concurrently with the translation lookaside buffer lookup being performed on the first thread for locating address translation data for mapping the simulated physical address to the virtual address of the emulator;
    while the page table entry lookup is being performed on the second thread, determining whether that the translation lookaside buffer lookup results in a miss or a match;
    completing the page table entry lookup; and
    once the page table entry lookup has completed, writing a return value from the second thread to a global variable where the first thread can pick up the return value via another spinloop.

20. A computer-readable storage medium having stored computer-executable instructions causing a computer to perform the steps recited in claim 19.

* * * * *